United States Patent
Parker

(10) Patent No.: US 11,148,586 B2
(45) Date of Patent: Oct. 19, 2021

(54) WHEEL ILLUMINATION APPARATUS

(71) Applicant: Shanon Dale Parker, Indialantic, FL (US)

(72) Inventor: Shanon Dale Parker, Indialantic, FL (US)

(*) Notice: Subject to any disclaimer, the term of this patent is extended or adjusted under 35 U.S.C. 154(b) by 0 days.

(21) Appl. No.: 17/249,381

(22) Filed: Mar. 1, 2021

(65) Prior Publication Data

US 2021/0268955 A1 Sep. 2, 2021

Related U.S. Application Data

(60) Provisional application No. 62/983,235, filed on Feb. 28, 2020.

(51) Int. Cl.
*B60Q 1/32* (2006.01)
*F21V 23/00* (2015.01)
*F21V 3/00* (2015.01)

(52) U.S. Cl.
CPC ............... *B60Q 1/326* (2013.01); *F21V 3/00* (2013.01); *F21V 23/001* (2013.01)

(58) Field of Classification Search
CPC .......... B60Q 1/326; F21V 3/00; F21V 23/001
USPC ......................................................... 362/500
See application file for complete search history.

(56) References Cited

U.S. PATENT DOCUMENTS 6,116,762 A * 9/2000 Kutlucinar ............. B60Q 1/326
362/500

* cited by examiner

*Primary Examiner* — Jason M Han
(74) *Attorney, Agent, or Firm* — Dunlap Bennett & Ludwig, PLLC; Brendan E. Squire

(57) ABSTRACT

A wheel illumination apparatus is disclosed. The wheel illumination apparatus includes a diffuser ring set behind wheel of a motor vehicle with a lighting source disposed behind the diffuser to illuminate the wheel. The light source is carried in a channel ring that is positioned on an inboard side of the diffuser ring. The light source may be an LED lighting strip. The light strip may be electrically coupled to an electrical system of the motor vehicle or may have a rechargeable battery. The lighting system of the present invention creates a visual impression where the wheels themselves seem to glow, rather than the wheel well or other areas on a vehicle.

12 Claims, 4 Drawing Sheets

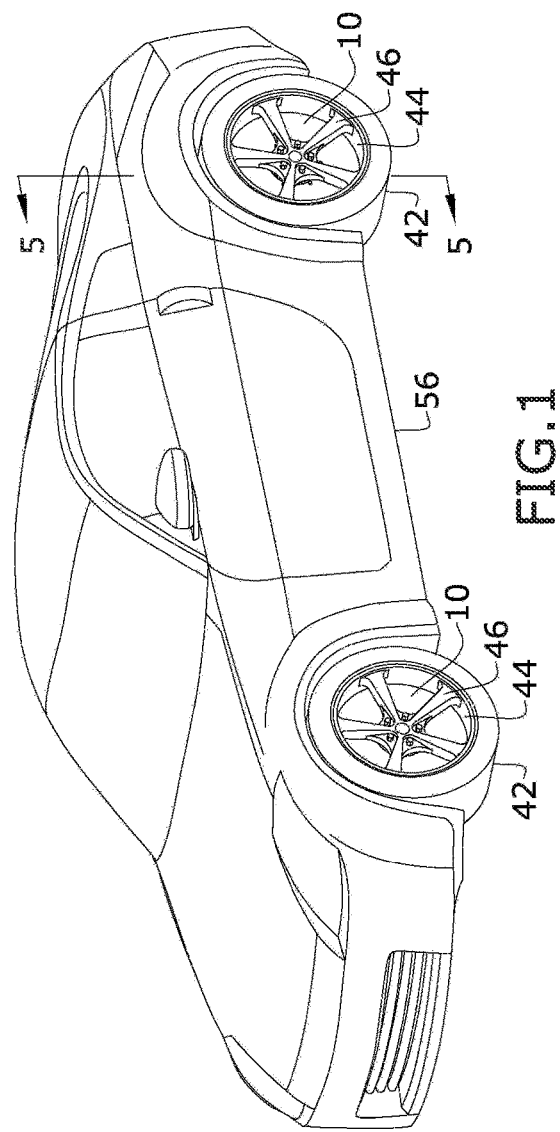
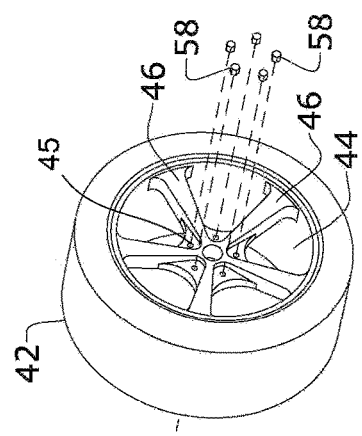
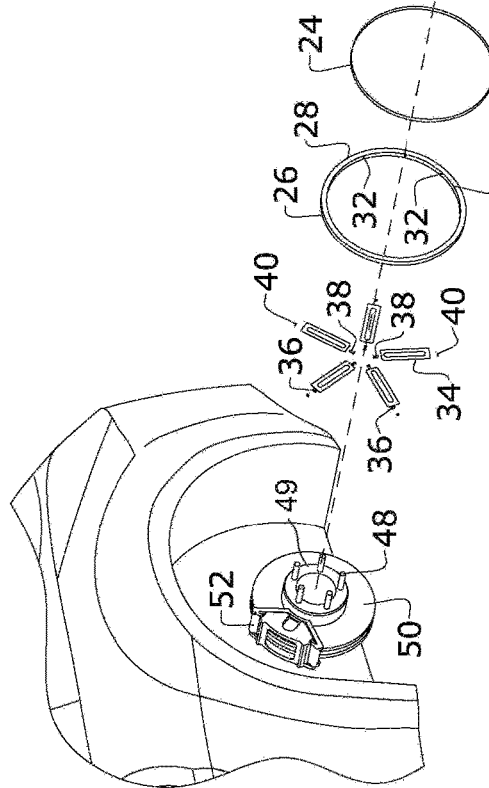
FIG. 1
FIG. 2

WHEEL ILLUMINATION APPARATUS

CROSS-REFERENCE TO RELATED APPLICATION

This application claims the benefit of priority of U.S. provisional application No. 62/983,235 filed Feb. 28, 2020, the contents of which are herein incorporated by reference.

BACKGROUND OF THE INVENTION

The present invention relates to wheel assemblies, and more particularly to apparatus and methods of illuminating a wheel assembly.

Lighting effects packages for motor vehicles have become increasingly popular. These packages typically illuminate the underside of the motor vehicle carriage. Other lighting effects packages illuminate the wheel wells of the motor vehicle. However, the provision of lighting effects to a wheel assembly remain very limited.

As can be seen, there is a need for an improved lighting effects package for Illumination of the wheel assembly that can provide improved visibility of the vehicle and also adding to the visual appeal to the motor vehicle.

SUMMARY OF THE INVENTION

In one aspect of the present invention, a wheel illumination apparatus for a wheel assembly is disclosed. The wheel illumination apparatus includes a hub adapter having at least one mounting hole adapted to couple with a hub rotatably carrying the wheel assembly with the hub adapter configured to be disposed between the wheel assembly and the hub. A diffuser ring formed of a transparent or a translucent material attached to the hub adapter. The diffuser ring is configured to be disposed on an inboard face of the wheel assembly. A channel ring has a circumferential channel defined therein. The channel ring is configured to be mounted adjacent to an inboard face of the diffuser ring. A light source is carried within the channel ring. The light source oriented to project an emitted light through the inboard face of the diffuser ring.

In some embodiments, the at least one mounting hole includes a plurality of mounting holes. The plurality of mounting holes are radially disposed in a spaced apart relation according to a selected bolt pattern of the hub. The plurality of mounting holes may also be disposed in a spaced apart relation according to a plurality of bolt patterns.

In some embodiments, channel ring is coupled in a fixed relation about the hub and axially aligned with a rotational axis of the hub. A plurality of arms are configured to interconnect the channel ring with a stationary hardpoint proximal to the hub. An elongate slot may be defined in each of the plurality of arms. The elongate slot is adapted to receive a fastener to couple the plurality of arms to the stationary hardpoint. A mounting tab may be defined at a distal end of each of the plurality of arms. A plurality of attachment points are radially disposed in a spaced apart relation about the channel ring. A fastener secures the mounting tab with a selected one of the plurality of attachment points.

In other embodiments, a wire harness is adapted to electrically couple the light source to a power source.

In other aspects of the invention, a wheel illumination apparatus for a wheel assembly is disclosed. The wheel illumination apparatus includes a diffuser ring formed of a transparent or a translucent material configured to be disposed on an inboard face of the wheel assembly and rotationally carried with the wheel assembly. A channel ring has a circumferential channel defined therein. The channel ring is configured to be mounted adjacent to an inboard face of the diffuser ring. A light source is carried within the channel ring. The light source is oriented to project an emitted light through the inboard face of the diffuser ring.

In some embodiments, a hub adapter has at least one mounting hole adapted to couple with a hub rotatably carrying the wheel assembly with the hub adapter configured to be disposed between the wheel assembly and the hub. In this case, the diffuser ring is rotationally carried by the hub adapter.

In some embodiments, a plurality of arms are configured to interconnect the channel ring with a stationary hardpoint proximal to the hub.

In some embodiments, an elongate slot is defined in each of the plurality of arms. The elongate slot is adapted to receive a fastener to couple the plurality of arms to the stationary hardpoint. A mounting tab defined at a distal end of each of the plurality of arms. A plurality of attachment points are radially disposed in a spaced apart relation about the channel ring. A fastener secures a mounting tab with a selected one of the plurality of attachment points.

In yet other embodiments, the channel ring is configured to be axially aligned with a rotational axis of the hub.

These and other features, aspects and advantages of the present invention will become better understood with reference to the following drawings, description and claims.

BRIEF DESCRIPTION OF THE DRAWINGS

FIG. 1 is a perspective view of the wheel illumination apparatus, shown in-use applied to a motor vehicle.

FIG. 2 is an exploded view of the wheel illumination apparatus.

DETAILED DESCRIPTION

Figure 3:
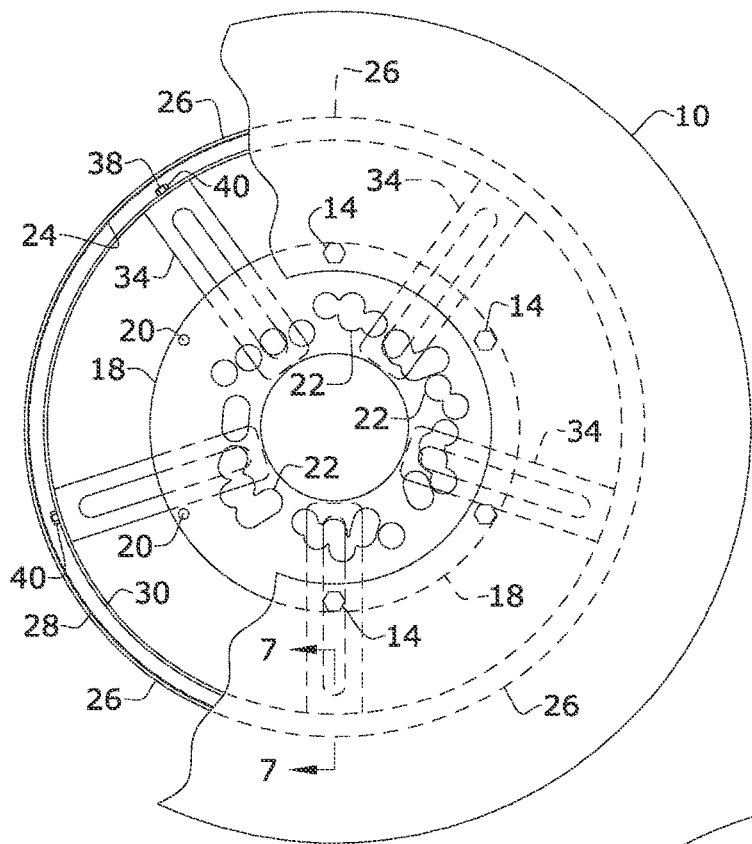
FIG. 3 is a front elevation view of the wheel illumination apparatus.

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provides a system, method, and apparatus for illuminating a wheel assembly. A wheel illumination apparatus of the present invention provides illumination of an interior well of a spoked wheel assembly that provides improved visibility of the wheel assembly and an enhanced visual appeal for customizing a wheel assembly.

A wheel illumination apparatus according to aspects of the invention includes a diffuser ring 10 and a light ring 24 mounted with the wheel assembly that combine to illuminate the inside of a vehicles 56 wheel 55 for safety and a visually appealing look. From a safety standpoint, the vehicle 56 is much more visible and therefore safer than without this product. The wheel illumination apparatus may be utilized with both on and off-road vehicle 56 and is readily adaptable to providing illumination to any spoked, or slotted wheel 44.

Figure 4:
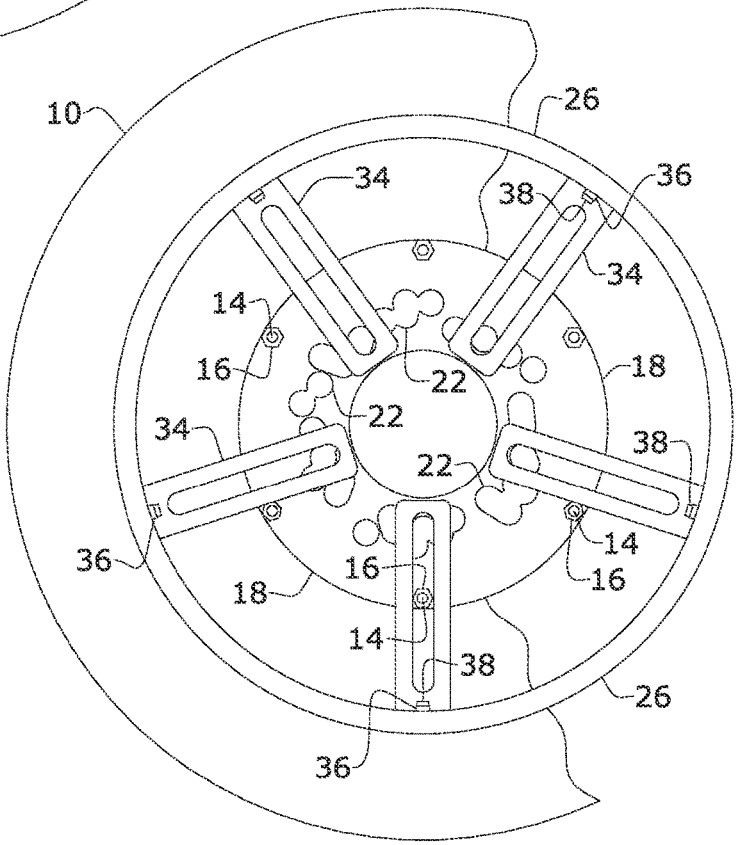
FIG. 4 is a back elevation view of the wheel illumination apparatus.
Figure 5:
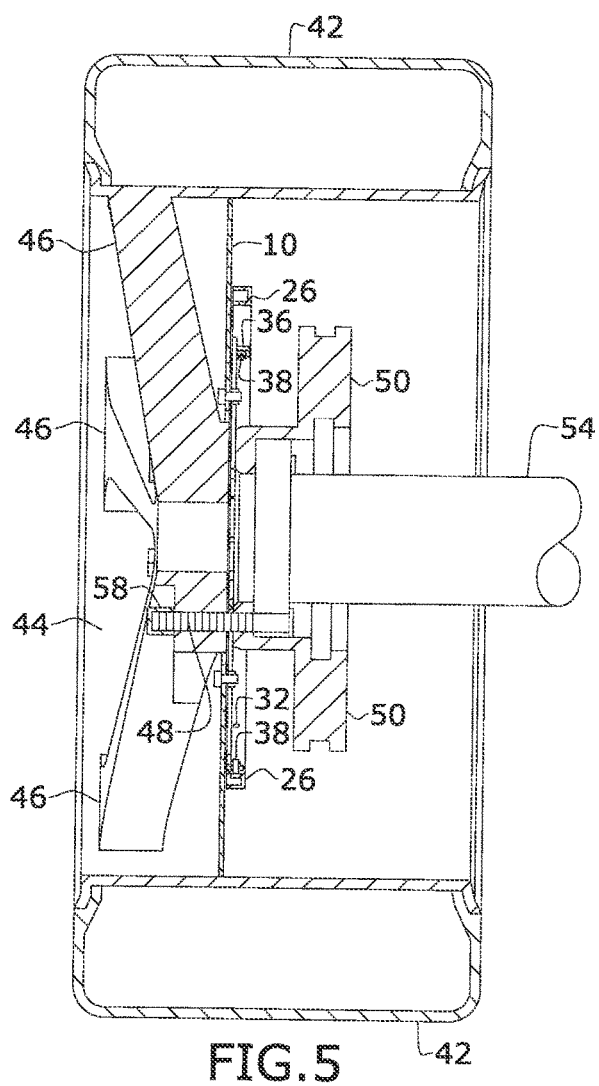
FIG. 5 is a section taken along line 5-5 from FIG. 1
Figure 6:
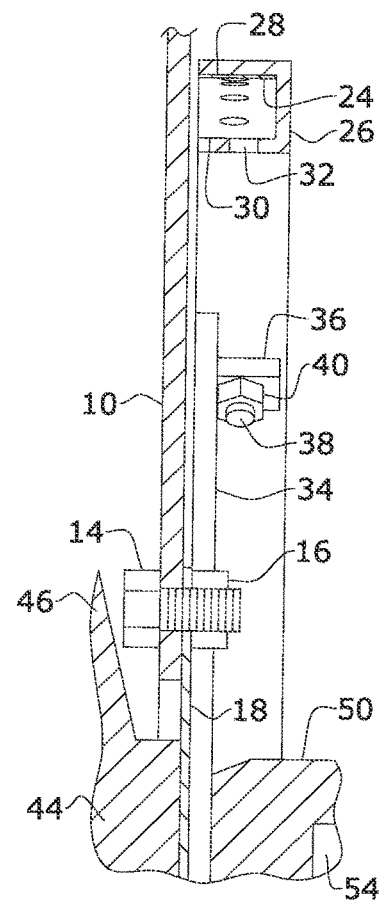
FIG. 6 is an enlarged section view.
Figure 7:
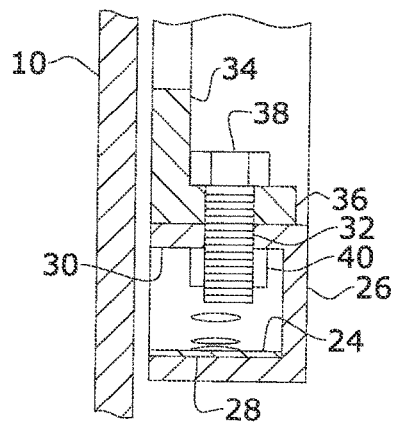
FIG. 7 is a section taken along line 7-7 from FIG. 3
Figure 8:
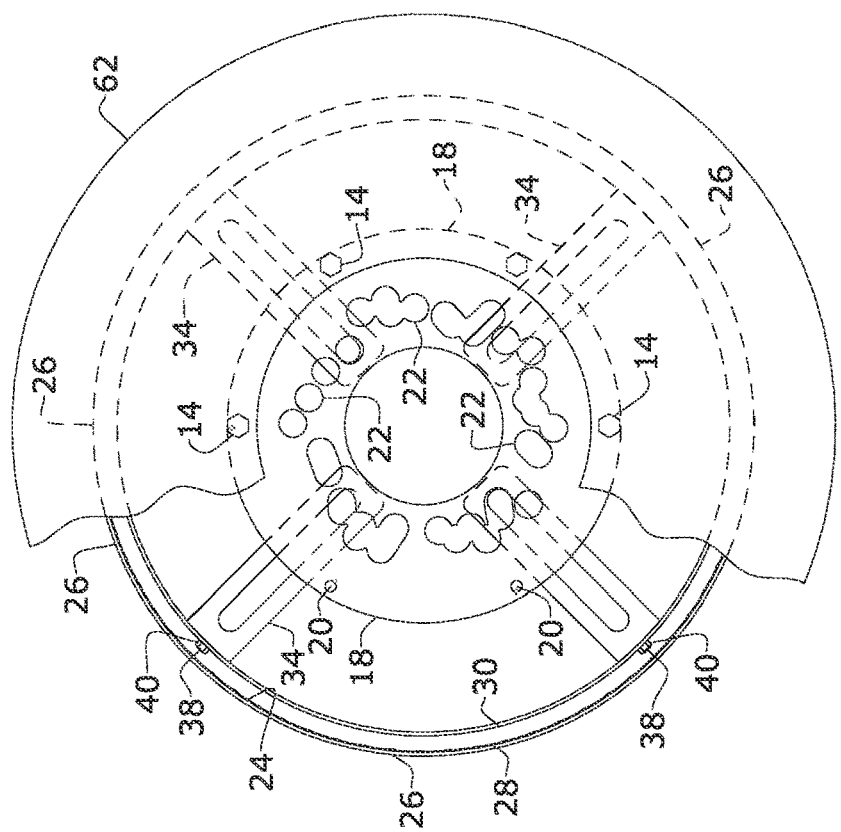
FIG. 8 is the larger alternate embodiment of the wheel illumination apparatus.
Figure 9:
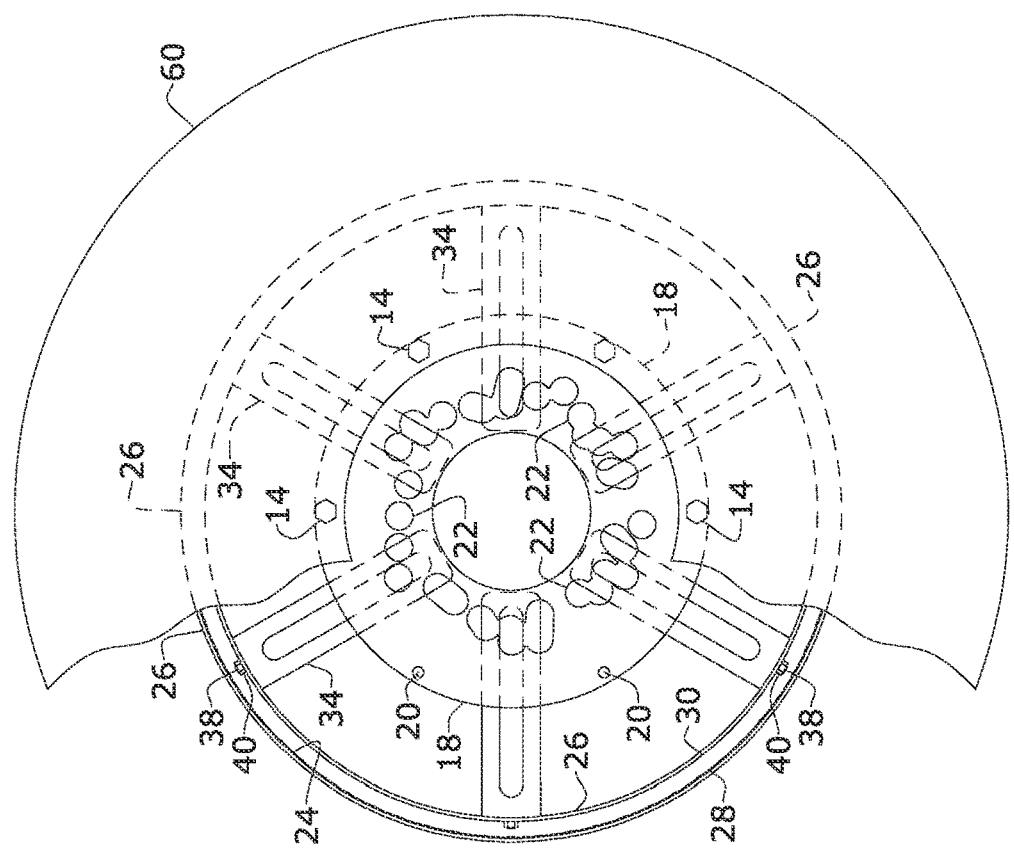
FIG. 9 is the smaller alternate embodiment wheel illumination apparatus.

Various aspects of the invention are shown in reference to the drawings of FIGS. 1-9. A motor vehicle 56 is shown with wheel assemblies mounted thereto. The wheel assembly includes a wheel 44 having a plurality of spokes 46, and a tire 52 mounted to the wheel. The wheel 44 is mounted to a hub 49 the motor vehicle 56. The hub has a plurality of wheel studs 48, disposed in a spaced apart bolt pattern about a rotational axis of the hub 49 rotationally carried by an axle 54. The spaced apart pattern, may be a 4-bolt pattern, 5-bolt pattern, 6-bolt pattern, etc., corresponding to a plurality of wheel mounting apertures 45 disposed about a rotational axis of the wheel 44. The wheel 44 is mounted to the hub 49 by a lug nut 48 for each of the plurality of wheel studs 48. The hub 49 may carry a brake rotor 50 disposed for a braking action by operation of a brake caliper 52 that is mounted to a stationary, non-rotating mounting point, or hardpoint, of a vehicle suspension.

The wheel illumination apparatus according to aspects of the invention is mounted between the wheel 22 and the hub 49 of the motor vehicle 56. The wheel illumination apparatus includes a diffuser ring 10. The diffuser ring 10 is formed of a transparent or a translucent material. The diffuser ring may be a light diffusing material, such as a frosted plexiglass or a poly-carbonate material. Graphics may be added to the diffuser ring 10 to add a custom visual effect if desired. The diffuser ring 10 is attached to a hub adapter 18 via a plurality of fasteners 14, 15 such as rivets, bolts, screws, or an adhesive, to form a diffuser assembly. The diffuser assembly is connect to the hub 49 of the motor vehicle 56 for rotation with the wheel assembly, when mounted.

The hub adapter 18 has at least one hole for mounting to a hub 49 rotationally carrying the wheel assembly. The hub adapter 18 may also include a plurality of holes 20 radially disposed in a spaced apart relation through a face of the hub adapter 18. The plurality of holes 20 may be provided to a specific bolt pattern. Alternatively, the plurality of holes 20 may be provided to correspond with a plurality of bolt patterns. In the non-limiting embodiments shown, the diffuser ring 10 is mounted to an outboard side of the hub adapter. As will be appreciated from the present disclosure, the diffuser ring 10 may be mounted to either an inboard side or an outboard side of the diffuser ring 10.

A light ring 24, such as an LED light strip, electro luminescence, or other light emitting device, is carried within a channel ring 56. The channel ring 26 may have a C-shaped cross section in which the light ring 24 is oriented to project at least a portion of an emitted light through the diffuser ring 10. For an enhanced lighting effect, the light ring 23 may be oriented so that a portion of the emitted light is projected within a wheel well of the motor vehicle 56. The channel ring 26 is retained to a stationary hardpoint around the rotating hub assembly 49, such as a mounting point for a brake dust cover or stationary elements of the hub assembly 49 that are carried by a motor vehicle suspension.

The "frosted" diffuser ring 10 diffuses the led lighting while the channel ring 26 deflects the lighting into the center of the vehicle wheel. Together this creates a "glowing" effect. The light source may be selected in a variety of colors, and may also include a user selectable color, for example via an RGB LED lighting source that is tunable to achieve a light source of a desired color.

In some embodiments, a plurality of arms 34 interconnect the channel ring 56 with one or more stationary hardpoints of the motor vehicle 56. The plurality of arms 34 have a slotted aperture to provide for a universal fit to the selected stationary hardpoints, selected depending upon the make and model of the motor vehicle 56 and whether the apparatus is mounted to a front or a rear wheel mounting point. The channel ring 26 connects inboard the diffuser assembly, in a fixed relation, such as by attaching to the brake rotor cover, or other stationary hardpoint on the motor vehicle 56.

A mounting tab 36 may extend from a distal end of the arms 34. The mounting tab 36 may be attached to the channel ring 25 via a fasteners, such as a bolt 38 and a nut 40 combination, to secure the plurality of arms 34 with an attachment point 32 defined in in a spaced apart relation about the channel ring 26. The attachment point 32 may be defined on an inner wall 30 of the channel ring 26, while the light ring 24 may be carried on an outer wall 28 of the channel ring 26. An opening of the channel ring 26 may be oriented toward an inboard surface of the diffuser ring 10. The mounting tab 36 provides a desired offset from the selected mounting hardpoints to position the opening of the channel ring 26 proximal to the diffuser ring 10 when coupled to the motor vehicle 56. Preferably, the channel ring 26 is positioned so that is coaxial with the hub 49.

Wiring may connect the LED lighting 24 to a power source, such as a 12v source of the motor vehicle 56. The LED lighting may also include a battery and a charging source, such as a kinetic charger that develops an electrical charge from vibrations as the motor vehicle 56 transits a road surface. In this case, the arms 34 may be mounted with the hub adapter to the wheel mounting lugs 48 and rotationally carried with the hub 49. The light ring 24 may be electrical coupled to the driving lights of the motor vehicle so as to operate when vehicle lights are required. Alternatively, the light ring 24 may be electrically coupled to the motor vehicle 56 electrical system to illuminate when the vehicle 56 is in operation.

Each of the diffuser ring 10 and the channel ring 26 may have a radius corresponding to a radius of the wheel assembly to which it may be mounted.

To install the wheel illumination apparatus, simply remove the vehicle wheel assembly. Attach the channel ring 26 coaxial with the axle 54, such as to the brake dust cover mounting bolts, or other stationary hard point. Apply the diffuser ring assembly to the wheel mounting lugs 48. Wire the LED lighting 24 for connection to a power source. Light up the LED. Reattach the wheel assembly to the wheel mounting lugs 48 with the lug nuts 58.

It should be understood, of course, that the foregoing relates to exemplary embodiments of the invention and that modifications may be made without departing from the spirit and scope of the invention as set forth in the following claims.

What is claimed is:

1. A wheel illumination apparatus for a wheel assembly, comprising:
   a hub adapter having at least one mounting hole adapted to couple with a hub rotatably carrying the wheel assembly with the hub adapter configured to be disposed between the wheel assembly and the hub;
   a diffuser ring formed of a transparent or a translucent material attached to the hub adapter, the diffuser ring configured to be disposed on an inboard face of the wheel assembly;
   a channel ring having a circumferential channel defined therein, the channel ring configured to mounted adjacent to an inboard face of the diffuser ring; and a light source carried within the channel ring, the light source oriented to project an emitted light through the inboard face of the diffuser ring.

2. The wheel illumination apparatus of claim 1, further comprising:
the at least one mounting hole includes a plurality of mounting holes, wherein the plurality of mounting holes radially disposed in a spaced apart relation according to a selected bolt pattern of the hub.

3. The wheel illumination apparatus of claim 2, wherein the plurality of mounting holes are disposed in a spaced apart relation according to a plurality of bolt patterns.

4. The wheel illumination apparatus of claim 1, wherein the channel ring is coupled in a fixed relation about the hub and axially aligned with a rotational axis of the hub.

5. The wheel illumination apparatus of claim 4, further comprising:
a plurality of arms configured to interconnect the channel ring with a stationary hardpoint proximal to the hub.

6. The wheel illumination apparatus of claim 5, further comprising:
an elongate slot defined in each of the plurality of arms, the elongate slot adapted to receive a fastener to couple the plurality of arms to the stationary hardpoint;
a mounting tab defined at a distal end of each of the plurality of arms; and
a plurality of attachment points radially disposed in a spaced apart relation about the channel ring; and
a fastener securing a mounting tab with a selected one of the plurality of attachment points.

7. The wheel illumination apparatus of claim 1, further comprising:
a wire harness adapted to electrically couple the light source to a power source.

8. A wheel illumination apparatus for a wheel assembly, comprising:
a diffuser ring formed of a transparent or a translucent material configured to be disposed on an inboard face of the wheel assembly and rotationally carried with the wheel assembly by attaching to a hub adapter;
a channel ring having a circumferential channel defined therein, the channel ring configured to be mounted adjacent to an inboard face of the diffuser ring; and
a light source carried within the channel ring, the light source oriented to project an emitted light through the inboard face of the diffuser ring.

9. The wheel illumination apparatus of claim 8, further comprising:
the hub adapter having at least one mounting hole adapted to couple with a hub rotatably carrying the wheel assembly with the hub adapter configured to be disposed between the wheel assembly and the hub; and
the diffuser ring rotationally carried by the hub adapter.

10. The wheel illumination apparatus of claim 9, further comprising:
a plurality of arms configured to interconnect the channel ring with a stationary hardpoint proximal to the hub.

11. The wheel illumination apparatus of claim 10, further comprising:
an elongate slot defined in each of the plurality of arms, the elongate slot adapted to receive a fastener to couple the plurality of arms to the stationary hardpoint;
a mounting tab defined at a distal end of each of the plurality of arms; and
a plurality of attachment points radially disposed in a spaced apart relation about the channel ring; and
a fastener securing a mounting tab with a selected one of the plurality of attachment points.

12. The wheel illumination apparatus of claim 11, wherein the channel ring is configured to be axially aligned with a rotational axis of the hub.

* * * * *